(12) United States Patent
Donval

(10) Patent No.: US 12,185,699 B2
(45) Date of Patent: Jan. 7, 2025

(54) ASSEMBLY FOR TRANSPORTING AND SEPARATING LIVING POULTRY BIRDS

(71) Applicant: EGG-CHICK AUTOMATED TECHNOLOGIES, Landivisiau (FR)

(72) Inventor: Mickaël Donval, Plouedern (FR)

(73) Assignee: EGG-CHICK AUTOMATED TECHNOLOGIES, Landivisiau (FR)

( * ) Notice: Subject to any disclaimer, the term of this patent is extended or adjusted under 35 U.S.C. 154(b) by 306 days.

(21) Appl. No.: 17/777,584

(22) PCT Filed: Nov. 17, 2020

(86) PCT No.: PCT/EP2020/082426
§ 371 (c)(1),
(2) Date: May 17, 2022

(87) PCT Pub. No.: WO2021/099326
PCT Pub. Date: May 27, 2021

(65) Prior Publication Data
US 2022/0400655 A1 Dec. 22, 2022

(30) Foreign Application Priority Data
Nov. 20, 2019 (EP) ..................................... 19306490

(51) Int. Cl.
*A01K 45/00* (2006.01)
*A01K 29/00* (2006.01)
(Continued)

(52) U.S. Cl.
CPC ............ *A01K 45/00* (2013.01); *A01K 29/005* (2013.01); *A22C 21/0053* (2013.01); *B65G 47/14* (2013.01); *B65G 2201/0202* (2013.01)

(58) Field of Classification Search
CPC .. A22C 21/0053; A01K 45/005; A01K 45/00; A01K 29/005; B65G 47/14; B65G 47/1464; B65G 2201/0202; B65G 47/1435
See application file for complete search history.

(56) References Cited

U.S. PATENT DOCUMENTS 3,994,292 A 11/1976 Goodwin
4,191,130 A * 3/1980 Musgrave .............. A61D 1/005
119/439
(Continued)

FOREIGN PATENT DOCUMENTS

EP 0145077 A2 6/1985
EP 956766 A1 * 11/1999 ........... A01K 45/005
(Continued)

OTHER PUBLICATIONS

International Search Report for corresponding PCT/EP2020/082426 mailed Feb. 16, 2021.

*Primary Examiner* — James R Bidwell
(74) *Attorney, Agent, or Firm* — Wood, Phillips, Katz, Clark & Mortimer

(57) ABSTRACT

The present invention relates to an assembly for transporting and separating live poultry birds, in particular chicks. According to the invention, this assembly comprises:
  a first conveyor (10) for conveying the poultry birds,
  a carousel (12) comprising a rotating platform (14), said carousel (12) being configured to ensure, during the rotation of this platform (14), a spatial separation of the poultry birds introduced at the entry thereof so as to place them in a single file,
  an ejector (18) for ejecting the poultry birds thus separated from the carousel (12) and aligning them towards a discharge conveyor (19).

14 Claims, 2 Drawing Sheets

(51) Int. Cl.
*A22C 21/00* (2006.01)
*B65G 47/14* (2006.01)

(56) References Cited

U.S. PATENT DOCUMENTS

| | | | | |
|---|---|---|---|---|
| 4,658,476 | A | * | 4/1987 | van den Brink ... A22C 21/0053 452/53 |
| 6,609,479 | B2 | * | 8/2003 | Storer .................... A61D 1/025 119/843 |
| 2018/0353081 | A1 | | 12/2018 | Karimpur |

FOREIGN PATENT DOCUMENTS

| | | | | |
|---|---|---|---|---|
| FR | 2681801 A1 | * | 4/1993 | ............. A01K 45/00 |
| JP | S55169168 U | | 12/1980 | |
| JP | S5661933 A | | 5/1981 | |

* cited by examiner

[Fig. 1]
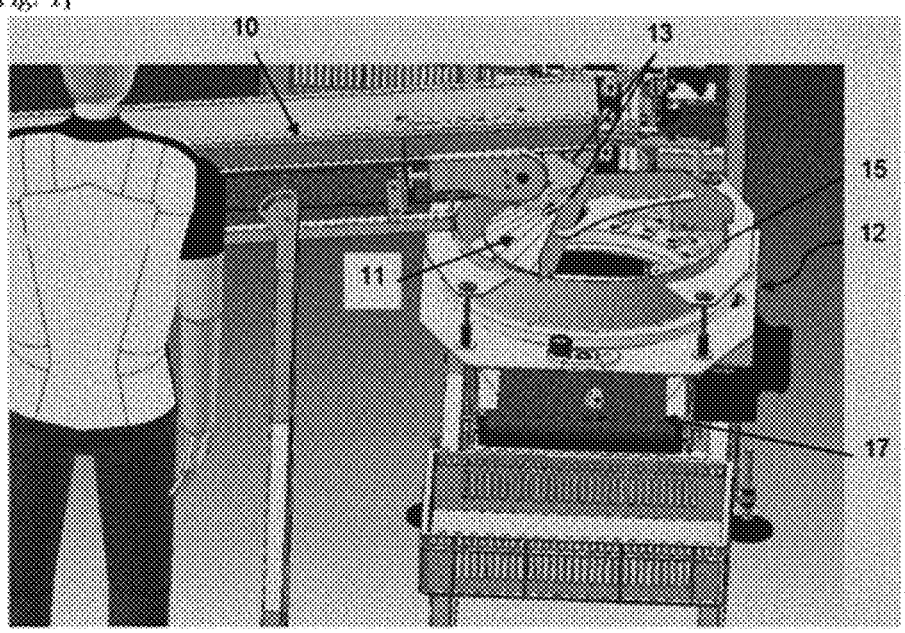
[Fig. 2]
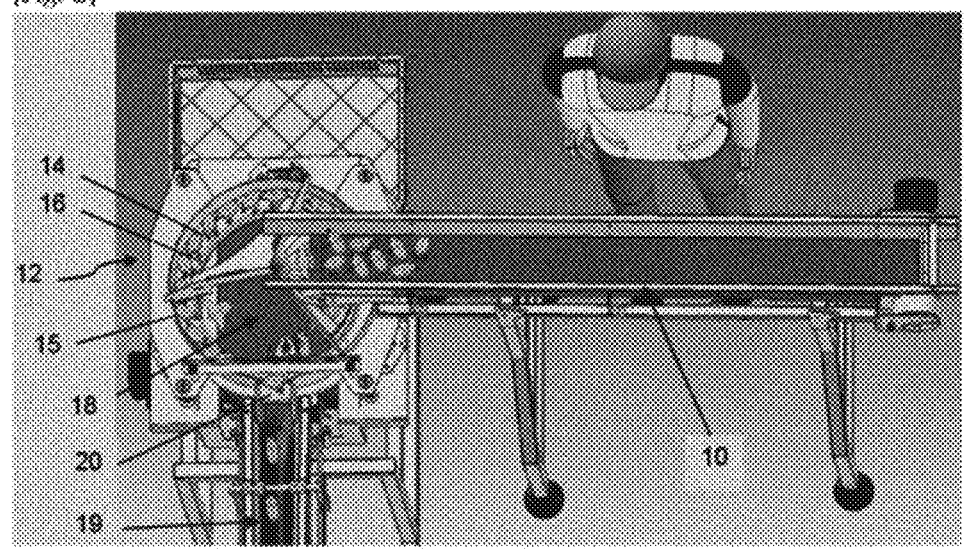

[Fig. 3]
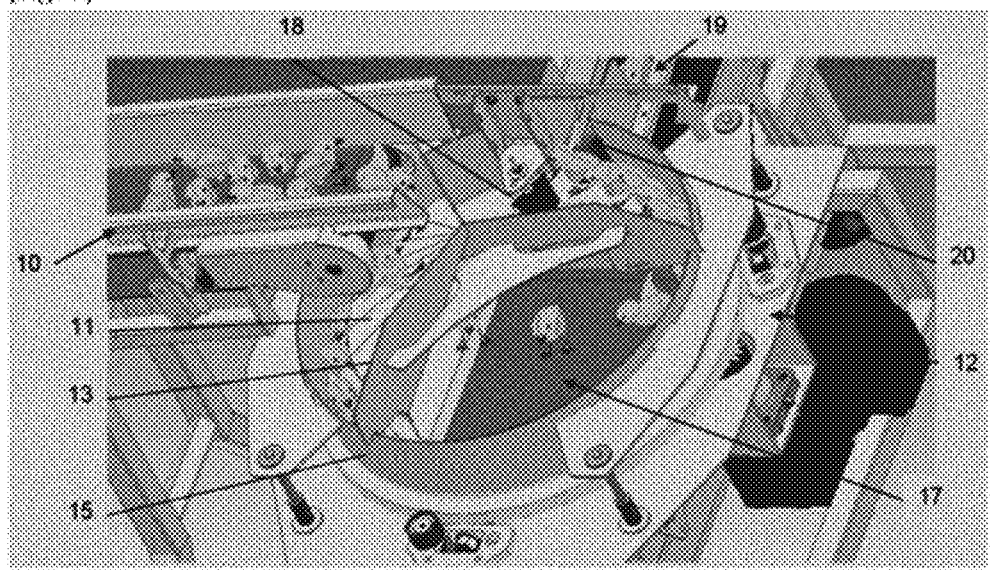
[Fig. 4]
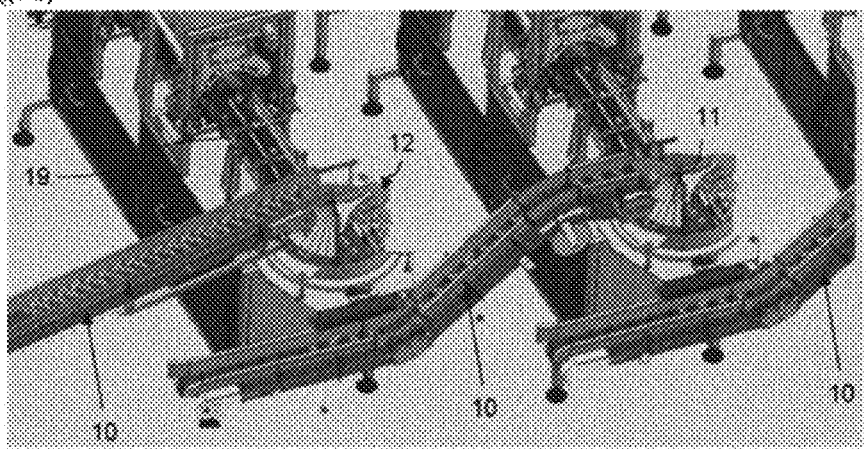

ASSEMBLY FOR TRANSPORTING AND SEPARATING LIVING POULTRY BIRDS

TECHNICAL FIELD

The present invention relates to an assembly for transporting and separating live poultry birds such as chicks.

It also relates to a chick characterization system comprising such a transport and separation assembly.

PRIOR ART

It is known in the field of poultry farming to handle chicks in order to carry out various operations such as determining the sex of each chick, injecting one or more treatments, weighing them or assessing their state of health.

These chicks may be handled manually or treated in a semi-automated manner.

In the latter case, they are typically transported by conveying systems which also ensure separation of these chicks, i.e., the creation of a space between these chicks.

Indeed, such separation is necessary for an individualized treatment of chicks on one or more workstations.

However, this separation must be properly carried out to guarantee an accurate classification of these chicks, while being as quick as possible in order to minimize the stress on the animals and maximize the yields.

Although the known conveyor and separation systems generally provide such separation of the chicks, it is observed that the latter is difficult, if not impossible, to adjust.

Consequently, these prior art conveyor and separation systems are not, or only slightly, adaptable to different devices for processing, in particular viewing, a chick.

This lack of adaptability has significant impacts for the operator, because the processing speed and/or the quality of this processing are necessarily affected.

Moreover, it is observed that chicks may endure significant stress with prior art conveyor and separation systems.

Indeed, these systems are particularly complex, noisy and hardly hygienic, because they are difficult to clean.

It is also observed that chicks may be subject to bruising and skeletal trauma during transport and separation.

Now, compliance with animal welfare standards is a major issue today.

Therefore, there is a pressing need for a system for conveying and separating chicks that is originally designed to make it possible to overcome the drawbacks of the prior art set out above.

OBJECT OF THE INVENTION

The present invention aims to overcome the drawbacks of the prior art by providing an assembly for transporting and separating live poultry birds such as chicks, simple in its design and in its mode of operation, ensuring the alignment of a batch of scattered poultry birds one behind the other.

Another object of the present invention is such an assembly for transporting and separating allowing adjustment of the distance, or separation, between two live poultry birds thus aligned to guarantee adaptation to different materials used in the classification and/or determine the state of health of these live animals.

Another object of the present invention is that such an assembly for transporting and separating live poultry birds respect the well-being of these animals.

Another object of the present invention is an automatic chick sexing system equipped with such an assembly for transporting and separating live poultry birds.

Another object of the present invention is a system for determining the state of health of poultry birds that is equipped with such an assembly for transporting and separating live poultry birds.

DISCLOSURE OF THE INVENTION

To this end, the invention relates to an assembly for transporting and separating live poultry birds.

According to the invention, this assembly comprises:
a first conveyor to convey these poultry birds,
a carousel comprising a rotating platform, this carousel being configured to ensure, during the rotation of this platform, a spatial separation of the poultry birds introduced at its entrance so as to place them in line on the rotating platform,
an ejector for ejecting from the carousel the poultry birds thus separated and directing them towards an discharge conveyor.

Advantageously, this carousel makes it possible to align the poultry birds one behind the other at an exit port of the latter, or on the rotating platform. This ejector, or ejection device, then makes it possible to eject these poultry birds one by one, as they appear, or arrive, in front of the exit port, through this exit port and towards an discharge conveyor.

For purely illustrative purposes, since this platform is annular, it may have a transverse dimension, or annular width, defining an area for receiving the live poultry birds, a single live bird being able to stand stably at a given point in this receiving area. Thus, a bird adjoining a position on the platform already occupied by another bird finds itself at least partially placed outside this receiving area, for example by being offset and positioned on an inner edge of the annular platform. Being in an unstable position, it is therefore likely to be ejected from the platform. This ensures a spatial separation of poultry birds placed in the same position on the rotating platform.

One or more control devices may also be implemented to control the correct positioning in line, i.e., one behind the other, of the live poultry birds on the annular platform after they have traveled a predefined trajectory with the rotating carousel.

For purely illustrative purposes, such a control device is a turnstile allowing the passage of a single bird at a time.

The original design of this assembly for transporting and separating live poultry birds makes it possible to position a scattered or unordered batch of live poultry birds, such as chicks, in line, one behind the other, and to create a separation between these poultry birds. This separation is advantageously uniform between the poultry birds thus aligned.

Such a scattered batch may result, for example, from the positioning on the first conveyor of a group of live poultry birds initially contained in a carrying crate or basket. Such positioning can be achieved when separating day-old chicks from their shells.

Advantageously, the spacing between the live animals thus aligned on the discharge conveyor is adjustable.

Such an adjustment may easily be made by adjusting the linear speed of the entry conveyor and the angular speed of the rotating carousel platform. The linear speed of the entry conveyor is always lower than the angular speed of the carousel's rotating platform to avoid an accumulation of poultry birds on the rotating platform.

It would also be possible to adjust the ejector activation frequency, which could be adjustable. To this end, the ejector could include a device for adjusting its activation frequency to, for example, delay the activation of this ejector. It could thus be considered to eject the poultry birds presenting themselves in line in front of the exit of the carousel not systematically but one bird out of two or even more.

Thus, and according to a particular embodiment of this assembly for transporting and separating live poultry birds, the first conveyor comprises a device for adjusting its linear speed, and the carousel comprises a device for adjusting the angular speed of its rotating platform to allow adjustment of the distance separating two immediately adjacent poultry birds in the line formed on the rotating platform.

It is also observed that such an assembly for transporting and separating is easy to clean and resistant to high-pressure washing, which makes it more hygienic.

According to another embodiment of this assembly for transporting and separating live poultry birds, it comprises a distribution device for receiving the live poultry birds from the first conveyor and introducing them onto the carousel.

Preferably, this distribution device is an inclined slide to guide the live poultry birds downwards towards the carousel.

Advantageously, as this slide is placed under a downstream end of the first conveyor, it forms a circular area intended to ensure a first spatial separation of the poultry birds received on its surface.

The poultry birds thus fall from the first conveyor onto the slide. This fall is accompanied by a slight deceleration of the poultry birds, since the latter are chicks or chickens and spontaneously spread their wings to cushion their fall.

Therefore, the linear speed of the first conveyor and the configuration of this distribution device ensure a smooth reception of the poultry birds on the slide.

The movement of these poultry birds on the surface of the slide also ensures their spatial separation or distribution.

Preferably, the distance, or height, separating the downstream end of the first conveyor, or entry conveyor, and the slide is at least seven (7) cm and preferably, between seven (7) cm and twelve (12) cm.

This circular area may be flat or substantially flat, or even be rounded to cause each bird to move towards one of the side edges of the slide. This circular area could also be a plate having indentations for operation in step-by-step mode.

Advantageously, this slide has vertical guide walls on its side edges to guide the poultry birds towards the carousel.

According to yet another embodiment of this assembly for transporting and separating live poultry birds, this ejector comprises at least one gas blowing device configured to push a live poultry bird out of the carousel.

Preferably, this ejection is carried out in a direction orthogonal, or substantially orthogonal, to the carousel.

Advantageously, each blowing device comprises a blowing head connected to a pressurized gas tank such as compressed air, and control means for sequentially releasing pressurized gas from the tank so that the ejection of the gas pressurized by the blowing head and the passage of a live bird in front of an exit port of the carousel are substantially simultaneous.

For purely illustrative purposes, this sequential release of pressurized gas could result from detecting the presence of a poultry bird at the exit port. Such detection could be carried out, for example, by means of a laser presence sensor.

Preferably, this blowing device is configured to emit pressurized gas jets lasting less than 0.5 s, and preferably 0.1 s.

These are thus pressurized gas flashes oriented in a given direction, preferably orthogonal to the carousel.

Advantageously, this blowing device is configured to emit gas jets at a pressure of between 4 bars and 8 bars.

Such an embodiment ensures gentler treatment of the poultry birds and thus makes it possible to advantageously respect the well-being of each of these animals.

According to yet another embodiment of this assembly for transporting and separating live poultry birds, this carousel comprises an annular rotating platform and a recovery conveyor placed under the rotating platform to receive the poultry birds leaving this platform. Preferably, the width and the geometry of this rotating platform, or plate, of annular shape, define an area for receiving live poultry birds on its surface. This receiving area allows holding a single live bird in a given position thereof. Thus, another live bird located in this position, or adjoining the latter, is in an unstable position on the rotating platform.

Advantageously, this assembly may also include an obstacle arranged so as to be located on the path of a live bird not located in this receiving area. Thus, when the trajectory of this poultry bird in an unstable position encounters this obstacle during the rotation of the platform, it is gently pushed from the platform towards the interior space of the carousel. This interior space being hollow, the live bird thus ejected is recovered by the recovery conveyor placed under the rotating platform of the carousel, and preferably, placed centrally to the carousel.

For example, this obstacle, or one of said obstacles, is a plate placed high above the rotating platform, said height H being determined to allow free passage to poultry birds positioned in a predefined area of the rotating platform and push the poultry birds, placed at least partially outside this predefined area of the rotating platform, towards the interior space of the carousel.

Alternatively, this obstacle may be a turnstile allowing the passage of only one live bird at a time.

Advantageously, this carousel also comprises a vertical guide wall extending over part of the outer peripheral edge of this carousel to retain the poultry birds moving with the rotating platform.

According to yet another embodiment of this assembly for transporting and separating live poultry birds, the rotation frequency of the carousel platform is between 4 rpm and 8 rpm. Such a rotation frequency of the carousel platform ensures that a live bird is not injured during its ejection from the rotating platform.

The angular speed of the carousel platform is advantageously adjustable.

According to yet another embodiment of this assembly for transporting and separating live poultry birds, the entry conveyor and the discharge conveyor are conveyors with a longitudinal or even linear axis, to ensure a linear movement of the poultry birds on their surface.

For example, it is an endless belt conveyor.

The present invention also relates to an automatic chick sexing system, equipped with at least one assembly for transporting and separating live poultry birds as described above.

The present invention also relates to a system for determining the state of health of poultry birds, equipped with at least one assembly for transporting and separating live poultry birds as described above.

In a known manner, such a system comprises a conveyor to bear one or more poultry birds and move them past an analysis station to perform a quality sorting of these poultry birds.

This analysis station comprises at least one image capture device for capturing one or more images of a bird; a data storage unit comprising a library of digital images of poultry birds in good health and other poultry birds in poor health, and a processor connected, or in communication with the image capture device and the data storage unit, whereby the acquired image or images of the bird are compared to the library digital images to determine the state of health of that bird.

BRIEF DESCRIPTION OF THE DRAWINGS

Other advantages, purposes and particular characteristics of the present invention will emerge from the following description, made for explanatory purposes and in no way limiting, in relation to the appended drawings, in which:

FIG. 1 is a partial perspective view of an assembly for transporting and separating chicks according to a particular embodiment of the present invention;

FIG. 2 is a top view of the assembly for transporting and separating of FIG. 1;

FIG. 3 is an enlarged view of the assembly for transporting and separating of FIG. 1 showing the slide and carousel;

FIG. 4 is a schematic representation of an installation comprising several assemblies for transporting and separating as shown in FIG. 1, which are interconnected;

DESCRIPTION OF THE EMBODIMENTS

The drawings and the description below contain, for the most part, evident elements. They may therefore not only serve to better understand the present invention, but also contribute to its definition, where appropriate.

First of all, it should be noted that the figures are not to scale.

FIGS. 1 to 3 schematically illustrate an assembly for transporting and separating chicks according to a particular embodiment of the present invention.

Such an assembly for transporting and separating is intended to ensure the line-up of a group of chicks, initially unordered, while creating a spacing, or spatial separation, between these chicks so that they can be presented individually in front of a workstation.

This assembly comprises a first linear conveyor 10, called the entry conveyor, to transport the chicks to be processed. This entry conveyor 10 is here a belt conveyor.

Under the downstream end of this first conveyor 10, is placed a slide 11 having the shape of an angular area making it possible to ensure a distribution or sorting of the chicks received on its surface towards a rotating carousel 12. For purely illustrative purposes, the angular opening of this area is here 120°.

This slide 11 is inclined to guide the chicks moving on its surface downwards towards the carousel 12. This slide 11 is metallic here to facilitate its cleaning, but it could also be made of plastic material.

Vertical guide walls 13 are advantageously placed on the side edges of the angular area of the slide 11 to gently guide the poultry birds coming against these walls towards the rotating carousel 12.

This rotating carousel 12 comprises an annular platform 14 defining a hollow interior space of the carousel 12 and a vertical axis around which it is rotated by a motor. The rotation of this annular platform 14 depends on the operating speed of this motor, which thus makes it possible to control the angular speed of the rotating platform 14. The linear speed of the first conveyor 10 is lower than the rotational speed of the annular platform 14 to prevent an accumulation of chicks.

A vertical guide wall 15 extends over part of the outer peripheral edge of this carousel 12 to retain the chicks on the move with the annular platform 14.

This annular platform 14 defines an area for transporting or receiving chicks between this vertical guide wall 15 and the interior space of the carousel 12, the transverse dimension of said area allowing the stable positioning of a single chick at one given point of this area. The surface of this transport area may advantageously be embossed to provide each chick with a receptacle.

Thus, when a chick arrives on this rotating platform 14, at a point in the transport area already occupied by a first chick, this other chick is forced to position itself behind or in front of this first chick if a free space is offered to it or, failing that, to shift laterally to find a support position. Given the configuration of the rotating carousel 12, this chick may, for example, bear on the inner rim 16 of this annular platform 14. In this position, it is therefore in an unstable position and is likely to be ejected from the annular platform 14 towards the hollow interior space of the rotating carousel 12.

This assembly may also include one or more control devices (not shown) placed on the trajectory of the chicks driven in rotation by the annular platform 14. By way of example, such a control device is a turnstile allowing a unidirectional passage to one chick at a time. Should another chick present itself in front of the turnstile at the same time, or substantially at the same time, as a first chick, it will face an obstacle which will naturally and delicately push it out of the annular platform 14 and towards the interior space of the carousel 12.

A recovery conveyor 17 is arranged in this interior space and under the platform 14 to receive the chicks pushed out of the platform 14 in rotation.

The chicks thus transferred to the recovery conveyor 17 are then redirected to the entry conveyor 10 for a new processing cycle.

The chicks placed in the transport area of the rotating platform 14 continue their movement in rotation until they reach an ejector 18, making it possible to eject and align the poultry birds thus separated from the carousel towards a mini-conveyor having a direction of movement perpendicular, or substantially perpendicular, to the axis of rotation of the carousel 12.

This mini-conveyor (not shown) is placed above a discharge conveyor 19 with a longitudinal axis having a linear speed of between 0.5 m/s and 0.9 m/s.

This ejector 18 here comprises a single blowing head connected to a compressed air tank, as well as control means for sequentially releasing compressed air from the tank so that the ejection of the compressed air by this blowing head and the passage of a live bird in front of an exit port 20 of the carousel are substantially simultaneous.

It is observed that the chicks transported by the discharge conveyor 19 are lined up and separated by a predefined spacing, which is advantageously adjustable.

What is claimed is:

1. An assembly for transporting and separating live poultry birds, characterized in that it comprises:
a first conveyor (10) for conveying the poultry birds,
a carousel (12) comprising a rotating platform (14), wherein said carousel (12) is configured to ensure, during the rotation of this platform (14), a spatial separation of the poultry birds introduced at its entry so as to align the latter, the carousel (12) comprising an annular platform (14) defining a hollow interior space of the carousel, a vertical guide wall (15) extending over part of the outer peripheral edge of the carousel to retain the chicks on the move with the annular platform, the annular platform (14) defining between the vertical guide wall (15) and the interior space of the carousel (12) a transport area whose dimension enables the positioning of a single chick at one given point of this area, an ejector (18) for ejecting the poultry birds thus separated from the carousel (12) and lining them up towards a discharge conveyor (19).

2. The assembly according to claim 1, characterized in that it comprises a distribution device (11) for receiving said live poultry birds from the first conveyor (10) and introducing them onto this carousel (12).

3. The assembly according to claim 2, characterized in that said distribution device (11) is an inclined slide to guide the poultry birds downwards towards said carousel (12).

4. The assembly according to claim 3, characterized in that said slide (11) is placed under a downstream end of the first conveyor (10) and forms a circular area.

5. The assembly according to claim 3, characterized in that said slide has vertical guide walls (13) on its side edges to guide the poultry birds towards said carousel (12).

6. The assembly according to claim 1, characterized in that said ejector (18) comprises at least one gas blowing device configured to push a live poultry bird out of the carousel (12).

7. The assembly according to claim 6, characterized in that each blowing device comprises a blowing head connected to a pressurized gas tank and control means for sequentially releasing pressurized gas from the tank so that the ejection of the pressurized gas by the blowing head and the passage of a live poultry bird in front of an exit port of the carousel (12) are substantially simultaneous.

8. The assembly according to claim 6, characterized in that said blowing device is configured to emit jets of pressurized gas lasting less than 0.5 s and preferably 0.1 s.

9. The assembly according to claim 6, characterized in that said blowing device is configured to emit gas jets at a pressure of between 4 bars and 8 bars.

10. The assembly according to claim 1, characterized in that said carousel (12) comprises a ring-shaped rotating platform (14) and a recovery conveyor (17) placed under the rotating platform (14) for receiving the poultry birds leaving this platform.

11. The assembly according to claim 1, characterized in that the frequency of rotation of the carousel platform (12) is between 4 rpm and 8 rpm.

12. The assembly according to claim 1, characterized in that the entry conveyor (10) and the discharge conveyor (19) are conveyors with a longitudinal axis to ensure linear movement of the poultry birds at their surface.

13. An automatic chick sexing system equipped with at least one assembly for transporting and separating live poultry birds according to claim 1.

14. A system for determining the state of health of poultry birds, equipped with at least one assembly for transporting and separating live poultry birds according to claim 1.

\* \* \* \* \*